United States Patent
Sutherland et al.

[11] Patent Number: 5,960,075
[45] Date of Patent: Sep. 28, 1999

[54] SWITCHMODE POWER CONVERTERS FOR TELEPHONE SUBSCRIBER LINE INTERFACE CIRCUITS

[75] Inventors: Brian A. F. S. Sutherland, Kanata; Brian Glenn Wall, Nepean; Alan William Jaakkola, Kanata, all of Canada

[73] Assignee: Northern Telecom Limited, Montreal, Canada

[21] Appl. No.: 08/390,715

[22] Filed: Feb. 16, 1995

[51] Int. Cl.⁶ .............. H04M 3/00; H04M 1/00; H02M 1/12; H03K 5/22; H03K 3/01
[52] U.S. Cl. ............ 379/399; 379/252; 379/324; 379/351; 379/353; 379/373; 379/401; 379/413; 379/418; 363/41; 327/114; 327/172
[58] Field of Search ................... 379/399, 324, 379/413, 373, 351, 353, 401, 418; 363/41; 327/172, 114

[56] References Cited

U.S. PATENT DOCUMENTS

| | | | |
|---|---|---|---|
| 4,192,975 | 3/1980 | Brockmann | 379/413 |
| 4,352,995 | 10/1982 | Yoshida et al. | 327/172 |
| 4,466,052 | 8/1984 | Thrap | 363/41 |
| 4,560,835 | 12/1985 | Bourgonje | 379/324 |
| 4,598,173 | 7/1986 | Chea, Jr. et al. | 379/339 |
| 4,703,500 | 10/1987 | Pollard | 379/252 |
| 4,742,441 | 5/1988 | Akerson | 363/97 |
| 5,103,114 | 4/1992 | Fitch | 327/114 |
| 5,103,387 | 4/1992 | Rosenbaum et al. | 363/21 |
| 5,237,606 | 8/1993 | Ziermann | 379/413 |
| 5,274,702 | 12/1993 | Rosch et al. | 379/399 |
| 5,323,461 | 6/1994 | Rosenbaum et al. | 379/399 |
| 5,359,280 | 10/1994 | Canter et al. | 323/282 |

*Primary Examiner*—Krista Zele
*Assistant Examiner*—Allan Hoosain
*Attorney, Agent, or Firm*—R. John Haley

[57] ABSTRACT

A power converter forming part of a telephone subscriber line interface circuit selectively generates a ringing signal waveform, for supply to the line, or a supply voltage for a driver circuit for providing loop current on the line. First and second fixed frequency PWM signals are used to control the power converter, and hence the voltage which it generates, for the ringing signal waveform and the supply voltage respectively. The first PWM signal enables the power converter to provide a high power level needed for ringing signals. The second PWM signal has a lower frequency, and hence results in lower switching losses and power dissipation, and a lower duty cycle, suitable for the lower power level needed for the supply voltage, and is conveniently produced by masking pulses of the first PWM signal. The frequency of the second PWM signal is greater than 270 kHz, to avoid transmitting spectral energy to the line below this frequency.

21 Claims, 2 Drawing Sheets

SWITCHMODE POWER CONVERTERS FOR TELEPHONE SUBSCRIBER LINE INTERFACE CIRCUITS

This invention relates to switchmode power converters, and is particularly concerned with such converters for generating controlled voltages in telephone subscriber line interface circuits.

BACKGROUND OF THE INVENTION

Rosenbaum et al. U.S. Pat. No. 5,103,387 issued Apr. 7, 1992, entitled "High Voltage Converter", and U.S. Pat. No. 5,323,461 issued Jun. 21, 1994, entitled "Telephone Line Interface Circuit With Voltage Switching", relate to a switchmode power converter and its arrangement and functioning in a line interface circuit for a two-wire telephone subscriber line.

As described in these patents, an individual line interface circuit includes the power converter, also referred to as a controlled voltage generator, a driver circuit, and a switching arrangement between the driver circuit, the power converter, the line, and a telephone central office (C.O.) battery. A control circuit is programmed to control the switching arrangement and the power converter to provide various operating functions which may be required of the line interface circuit. These functions include, in particular, providing relatively high voltage signalling, such as ringing, on the line, and providing a controlled d.c. feed to the line.

For example, for supplying a ringing signal on the ring wire of the line, the power converter is operated from the C.O. battery to generate at its output a high voltage ringing signal waveform, determined by the control circuit, and the switching arrangement connects this output to the ring wire of the line. A ground return for the ringing signal is provided via the switching arrangement and an output of the driver circuit, which in this case is powered by the C.O. battery. Voltages at the outputs of the driver circuit are controlled or steered by the control circuit in a manner which is described and claimed in Rosch et al. U.S. patent application Ser. No. 07/868,893 filed Apr. 16, 1992, entitled "Telephone Line Interface Circuit With Voltage Control" and which is also described in Rosch et al. U.S. Pat. No. 5,274,702 issued Dec. 28, 1993, entitled "Wideband Telephone Line Interface Circuit".

For providing a controlled d.c. feed (loop current) to the line, the control circuit controls the switching circuit to couple the outputs of the driver circuit to the line, and to provide a supply voltage to the driver circuit from either the C.O. battery or, preferably, from the output of the power converter. In the latter case the control circuit controls the power converter to generate a d.c. supply voltage which is typically lower than the C.O. battery voltage, and also controls the driver circuit so that a desired d.c. feed or loop current is maintained on the line in an off-hook state of a subscriber's telephone connected to the line.

Providing the power converter as a part of each individual line interface circuit in this manner provides distinct advantages, for example in that different high voltage signalling waveforms, e.g. ringing signal waveforms and cadences, message waiting signalling, and coin signalling, can be readily provided under software control, and d.c. feed or loop currents can be tailored to the characteristics of, and to the telephone services provided on, each subscriber line. It also presents several challenges.

For example, because the power converter is provided as a part of the individual line interface circuit and hence on a line card which must be accommodated within a predetermined limited physical space, the power converter itself must be physically small and efficient. In addition, the line interface circuit must meet criteria for spectral energy transmitted on the two-wire line; in particular spectral energy transmitted on the line in a frequency band from 4 kHz to 270 kHz must be very low to meet accepted standards.

In order to meet these challenges, the power converter as described in the patents referred to above is a switchmode power converter operating at a fixed high frequency (640 kHz) with a variable pulse width or duty cycle. The use of a switchmode power converter promotes efficiency. The use of a fixed frequency enables control signals to be easily generated and synchronized from clock signals used by other parts of the line interface circuit. The use of a fixed frequency also ensures that undesired switching energy is limited to the region of this fixed frequency and its harmonics, and thus can be removed by narrow band filtering so that it does not disturb other subscriber lines (due to crosstalk) or subscriber equipment coupled to the line. Narrow band filtering has fewer side effects on service performance than wide band filtering. The use of a high frequency allows the energy storage components of the power converter to be small and relatively inexpensive, and enables operation above the critical frequency band mentioned above.

The power converter must have a relatively high power capability, because high voltage signalling functions such as ringing typically require power levels of 5 to 20 W for full compliance with performance specifications over a wide range of subscriber telephone and terminal loads. However, for most of the time the operation of the power converter involves the delivery of relatively low power levels, for example less than 0.5 W for on-hook situations (idle or on-hook transmission), 0.5 to 1.5 W for off-hook POTS (plain old telephone service) situations, and less than 2.5 W for ISDN (integrated services digital network) services. Message waiting also involves the delivery of a relatively low power level for prolonged periods, but requires high voltage operation of the power converter.

Switching losses in switchmode power converters typically increase in proportion to increase in the switching or operating frequency. The high operating frequency is desired as discussed above in order to meet the requirements for high voltage signalling such as ringing; the periods of such signalling are relatively short so that the power consumption and dissipation due to switching losses are not major concerns. However, during the low power and relatively prolonged operating states discussed above, it is desirable to reduce the switching losses in the power converter, thereby reducing power consumption and power dissipation, and increasing long-term reliability as a consequence of lower operating temperatures.

An object of this invention, therefore, is to provide an improved switchmode power converter for a telephone subscriber line interface circuit which can operate with reduced switching losses.

SUMMARY OF THE INVENTION

According to one aspect of this invention there is provided a switchmode power converter including a switching transistor having a controlled path connected in series with an inductor, a control circuit for controlling the transistor to conduct during pulses of a variable pulse width signal thereby to control an output voltage of the power converter, and a circuit for providing as the variable pulse width signal selectively either a first PWM (pulse width modulated) signal at a first fixed frequency or a second PWM signal at a second fixed frequency lower than the first fixed frequency, the second PWM signal having a smaller duty cycle than the first PWM signal.

Preferably the power converter includes a logic circuit for producing the second PWM signal from the first PWM signal by periodically masking pulses, for example alternate pulses, of the first PWM signal. In this case the first fixed frequency is a harmonic of the second fixed frequency.

For use of the power converter in a telephone subscriber line interface circuit, preferably the second fixed frequency is greater than 270 kHz, this being an upper limit of a critical frequency band in which there is a requirement for very low transmission of spectral energy to the subscriber line. It follows that the first fixed frequency is also greater than 270 kHz in this case.

The invention also provides a telephone subscriber line interface circuit including a power converter as recited above for selectively generating a ringing signal waveform for supply to a telephone subscriber line or a supply voltage for a driver circuit for supplying loop current on the line, and a control circuit for supplying the power converter with the first PWM signal for generating the ringing signal waveform and the second PWM signal for generating the supply voltage for the driver circuit.

According to another aspect of this invention there is provided a telephone subscriber line interface circuit comprising: a driver circuit for supplying loop current on a telephone subscriber line; a power converter for selectively generating either a high voltage ringing signal waveform for supply to the line or a supply voltage for the driver circuit, the power converter including a switching transistor having a controlled path for supplying current to an inductor and a PWM (pulse width modulated) circuit for controlling the switching transistor thereby to control a voltage generated by the power converter; and a control circuit for selectively supplying from the PWM circuit to the switching transistor a first PWM signal having a first fixed frequency when the power converter is generating the high voltage ringing signal and a second PWM signal having a second fixed frequency, less than the first fixed frequency, when the power converter is generating the supply voltage for the driver circuit.

The invention also provides a method of reducing power dissipation in a power converter which is used in a telephone subscriber line interface circuit for selectively generating either a high voltage signalling waveform, at a relatively high power level for supply to a telephone subscriber line, or a supply voltage, at a relatively lower power level for a driver circuit for providing loop current on the telephone subscriber line, the power converter comprising a switching transistor responsive to a PWM (pulse width modulated) control signal for controlling a voltage generated by the power converter, comprising the steps of: providing a first PWM signal at a first fixed frequency as the PWM control signal for generating the high voltage signalling waveform at a relatively high power level; and providing a second PWM signal at a second fixed frequency, lower than the first fixed frequency, as the PWM control signal for generating the supply voltage at a relatively lower power level.

The method preferably further comprises the step of selectively generating a high voltage message waiting signal at a relatively low power level for supply to the telephone subscriber line by providing the second PWM signal as the PWM control signal. This provides the advantage of low power operation of the power converter for possibly prolonged periods while a message waiting signal is provided on the line, even though this is a high voltage signal.

BRIEF DESCRIPTION OF THE DRAWINGS

The invention will be further understood from the following description with reference to the accompanying drawings, in which.

DETAILED DESCRIPTION

Figure 1:
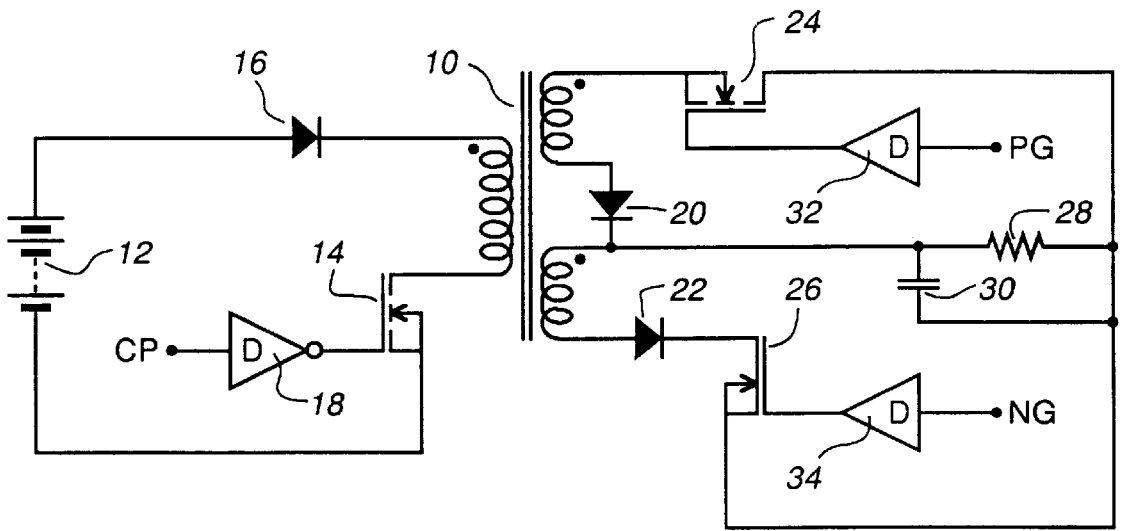
FIG. 1 schematically illustrates a fixed frequency variable pulse width switchmode power converter which is substantially known from U.S. Pat. No. 5,103,387 referred to above.

Referring to FIG. 1, a fixed frequency variable pulse width (and hence duty cycle) switchmode power converter includes a transformer 10 having a primary winding and two secondary windings with senses or polarities as represented in FIG. 1 in conventional manner by dots adjacent to the windings. The primary winding is an inductor which is connected to a battery 12, constituted by the 48 V battery of a telephone C.O., via the controlled path of a power switching FET (field effect transistor) 14 and a diode 16 to prevent reverse conduction in this primary circuit. The FET 14 is controlled by a control pulse signal CP supplied to its gate via an inverting driver circuit (D) 18.

The two secondary windings of the transformer 10 are connected via respective diodes 20 and 22 and the controlled paths of respective power switching FETs 24 and 26 thereby to supply voltages with opposite polarities to a load represented by a resistor 28. An energy storage capacitor 30 is connected in parallel with the load resistor 28 to smooth the output voltage of the power converter. The FETs 24 and 26 are controlled by respective pulse signals PG and NG supplied to their gates via respective drive circuits (D) 32 and 34.

Except for the addition of the diode 16, the power converter of FIG. 1 is the same as described with reference to FIG. 3 of U.S. Pat. No. 5,103,387 already referred to above. Reference is directed to that patent for a complete description of the power converter, its operation, and the signals CP, PG, and NG. It is observed here that, as described in that patent, the signal CP (signal PCDB in the patent) is a periodic high frequency signal having negative-going pulses whose width determines the duty cycle or conductive period of the FET 14. The high frequency enables the capacitor 30 to be of a relatively small size while still satisfying the peak power requirements of the power converter, for example for supplying a ringing signal to the load represented by the resistor 28 and in that case constituted by the subscriber line and subscriber telephone equipment connected to it. For example, the high frequency can be 640 kHz and a signal at this frequency can be derived from higher frequency clock signals used in the line interface circuit.

Figure 2:
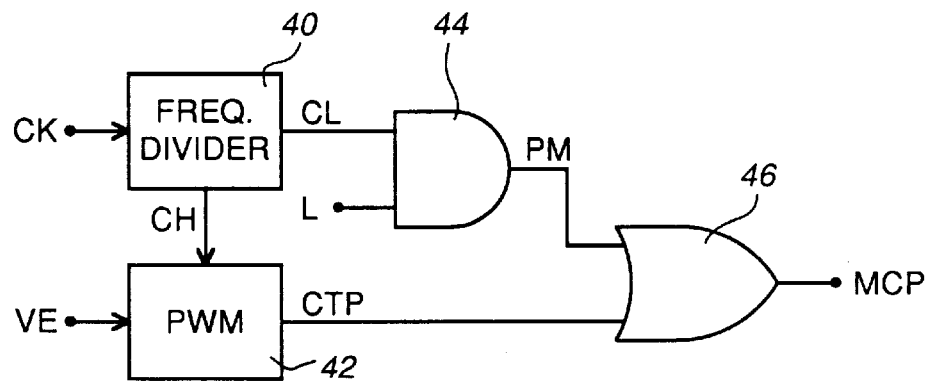
FIG. 2 schematically illustrates part of a control circuit for the power converter of FIG. 1 provided in accordance with an embodiment of this invention.

Referring now to FIG. 2, a frequency divider 40 is illustrated which is supplied with a high frequency, e.g. 2.56 MHz, clock signal CK and produces from this by frequency division a pulse signal CH for example having a frequency of 640 kHz. A pulse width modulator (PWM) 42 is supplied with the signal CH and produces a PWM control pulse signal CTP. The width of the negative-going pulses of the signal CTP is determined in dependence upon an error signal VE representing differences between the output voltage of the power converter of FIG. 1 and a desired value of this output voltage, as described in detail in U.S. Pat. No. 5,103,387. As described by that patent, the signal CP in the present FIG. 1 would be constituted directly by the signal CTP in the present FIG. 2. Again, reference is directed to U.S. Pat. No. 5,103,387 for a full description of the manner in which the PWM 42 operates.

The control circuit of FIG. 2 further includes an AND gate 44 and an OR gate 46. The frequency divider 40 also produces a further frequency-divided pulse signal CL, for example having a frequency of 320 kHz, which is supplied to one input of the AND gate 44. A second input of this gate 44 is supplied with a binary signal L as described further below. The AND gate 44 produces at its output a pulse mask signal PM which is supplied to one input of the OR gate 46, the control pulse signal CTP from the PWM 42 being supplied to a second input of this gate 46. An output of the OR gate 46 forms a masked control pulse signal MCP, which in this embodiment of the invention is used to constitute the signal CP in the power converter of FIG. 1.

Figure 3:
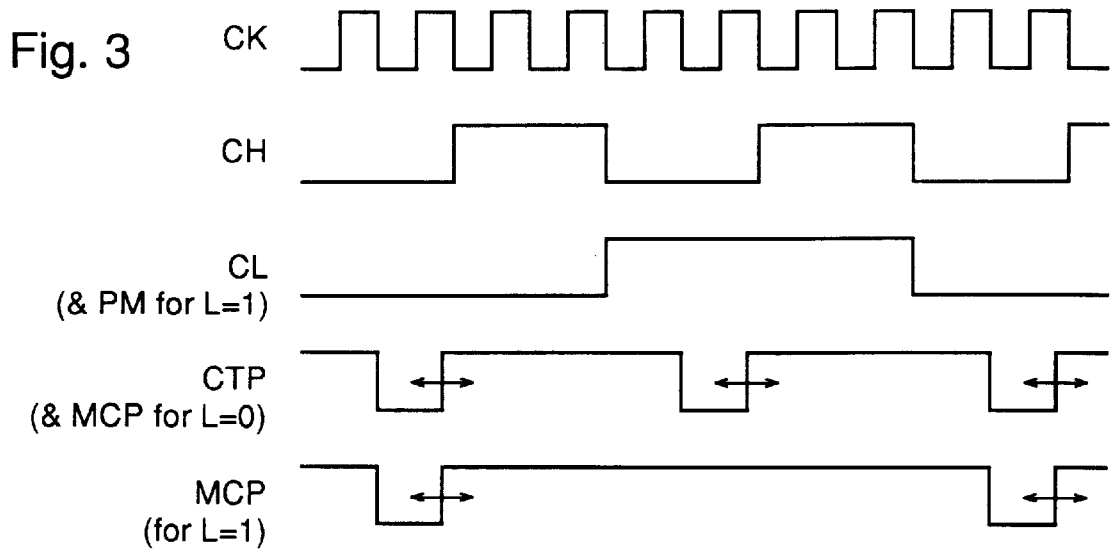
FIG. 3 is a signal timing diagram with reference to which the operation of the circuit of FIG. 2 is explained.

The signal timing diagram in FIG. 3 illustrates the signals CK, CH, CL (and hence the signal PM for the case when the signal L is a binary 1 (L=1)), CTP (and hence the signal MCP for the case when the signal L is a binary 0 (L=0)), and MCP for the case when L=1. As illustrated in FIG. 3, the signals CK, CH, and CL are square wave signals, the signal CL having half the frequency of the signal CH, which in this case has one quarter the frequency of the signal CK. For example, as indicated above the signals CK, CH, and CL can have frequencies of 2.56 MHz, 640 kHz, and 320 kHz respectively. Also as indicated above, the control pulse signal CTP is a PWM signal having negative-going pulses with the same frequency, 640 kHz, as the signal CH. As shown in FIG. 3, the pulses of the signal CTP have a falling edge which has a fixed timing centered relative to a binary 0 part of the signal CH, and a rising edge which is indicated by a double-headed arrow as occurring at a variable time depending on the PWM for controlling the output voltage of the power converter.

When the signal L is a binary zero (L=0), the AND gate 44 is inhibited so that the pulse mask signal PM is also a binary zero, and the output signal MCP is the same as the signal CTP as shown in FIG. 3. In this case the signal MCP supplied to the power converter as the signal CP is exactly the same as in the prior art. The power converter of FIG. 1 then operates entirely as described in U.S. Pat. No. 5,103,387, at an operating or switching frequency of 640 kHz. Thus a control circuit of the line interface circuit can provide the signal L=0 for operating the power converter as in the prior art to provide the desired high power levels for high voltage signalling such as ringing on the subscriber line.

When the signal L=1, the AND gate 44 is enabled, so that the pulse mask signal PM is the same as the signal CL. Via the OR gate 46, the binary 1 periods of this pulse mask signal inhibit alternate negative-going pulses of the signal CTP to produce the masked control pulse signal MCP. In consequence, it can be seen that the signal MCP in this case has a halved frequency of 320 kHz, and half the duty cycle of the signal CTP. Thus the control circuit of the line interface circuit can provide the signal L=1 for operating the power converter at the halved switching frequency, and hence with about half the switching losses, to provide the lower power levels for the more prolonged operating situations such as message waiting and d.c. feed as discussed above.

The halved duty cycle of the masked control pulse signal MCP is particularly advantageous in view of the nature of the power converter. The power converter has a so-called flyback or buck-boost architecture, in which energy stored in the inductor constituted by the primary winding of the transformer 10 is entirely transferred to the output in every switching cycle of the converter. In this circuit the current through the primary winding of the transformer rises linearly with time for as long as the controlled path of the FET 14 is conductive. Maintaining the same duty cycle at the halved operating frequency of 320 kHz as at the previous operating frequency of 640 kHz would undesirably result in increased peak currents in the primary winding circuit, and is not necessary because the extra power that this would generate is not required for the lower-power halved operating frequency. Halving the duty cycle in this case avoids any increase in peak currents, and is consistent with the lower power output required from the power converter at the lower operating frequency.

Thus it can be appreciated that in accordance with this embodiment of the invention, the power converter can have either of two operating modes, determined by the additional signal L. With L=0, the power converter operates at a switching frequency of 640 kHz for delivering high power levels to the load. With L=1, the power converter operates at the halved switching frequency of 320 kHz, switching losses are thereby approximately halved, and the duty cycle is halved so that there is no increase in peak currents. The PWM 42 continues to operate at the higher frequency of 640 kHz, but half of its output pulses in the signal CTP are masked. This provides a lower power output at greater efficiency, which is desirable for the prolonged operating situations such as message waiting and d.c. feed to the subscriber line as discussed above.

It should be appreciated that the power converter continues to operate as a fixed frequency, variable pulse width or duty cycle power converter (as distinct from variable frequency power converters), but the arrangement provides a selection of two different fixed frequencies for the power converter. As these fixed frequencies are harmonically related, narrow band filtering continues to be sufficient to remove unwanted switching energy. In addition, it will be noted that both frequencies are above the critical range of 4 kHz to 270 kHz for low spectral energy transmitted to the subscriber line, so that there is no need for complex filtering, which would increase costs and space requirements, in this frequency range.

Figure 4:
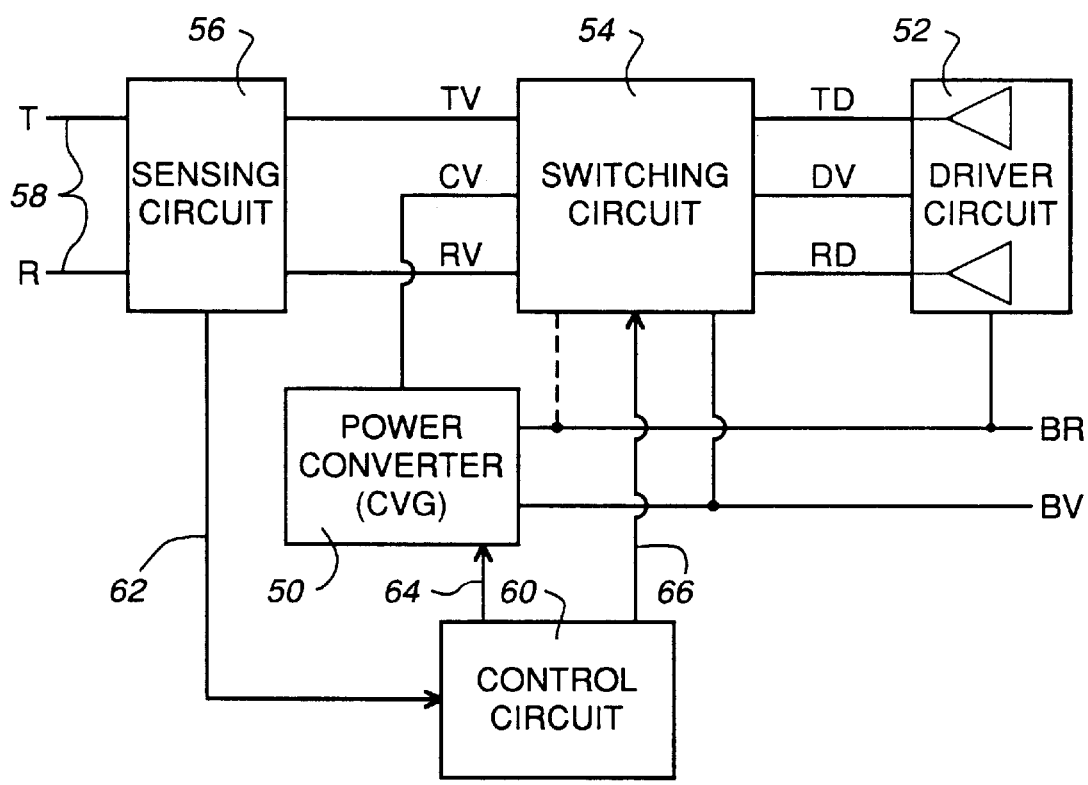
FIG. 4 is a block diagram illustrating a known arrangement of a telephone line interface circuit including the power converter.

FIG. 4 illustrates in a block diagram a known arrangement of a two-wire telephone subscriber line interface circuit, which is typically part of the telephone C.O., including a power converter or controlled voltage generator (CVG) 50 as described above. The line interface circuit also comprises a line driver circuit 52, a switching circuit 54 and a sensing circuit 56 via which outputs of the line driver circuit 10 are coupled to the tip wire T and the ring wire R of a two-wire telephone subscriber line 58, and the control circuit 60. Reference is directed to U.S. Pat. No. 5,323,461 already referred to for a complete description of the arrangement and operation of FIG. 4, which is only briefly described below.

The sensing circuit 56 provides on paths represented by a line 62 to the control circuit 60 signals representing currents on the line 58. The control circuit 60 monitors these currents and provides control signals for the power converter 50 and the switching circuit 54 via control paths 64 and 66 respectively. The power converter 50 is connected via a battery voltage line BV (typically −48 volts) and a battery return line BR (ground or zero volts) to the C.O. battery represented at 12 in FIG. 1. The power converter 50 produces at its output as described above a voltage CV which is controlled by the control circuit 60 via the control paths 64, via which the control circuit provides the signal MCP as described above.

The battery voltage line BV and the controlled voltage line CV are connected to the switching circuit 54, which under the control of the control circuit 60 selectively connects either of these to a driver voltage line DV which constitutes a supply voltage line for the line driver circuit 52. The tip and ring drive outputs of the line driver circuit 52, lines TD and RD respectively, are also connected to the switching circuit 54 which can connect them selectively, again under the control of the control circuit 60, to tip voltage and ring voltage lines TV and RV respectively, which in turn are coupled to the tip and ring wires T and R respectively via the sensing circuit 56 in known manner. The switching circuit 54 can also selectively connect, under the control of the control circuit 60, the controlled voltage line CV to one or both of the lines TV and RV to supply high voltage signalling to the line 58 as described above. The battery return line BR is optionally also connected to the switching circuit 54.

In operation, the control circuit 60 can control the switching circuit 54 to connect the line CV to the line TV and/or the line RV for high voltage signalling on the line 58, and to connect the line BV to the line DV to power the driver circuit 52 from the C.O. battery. The control circuit in this mode can produce either the signal L=0 for high power delivery such as for ringing signals, or the signal L=1 for low power delivery such as for a message waiting signal. Alternatively, the control circuit 60 can control the switching circuit 54 to connect the line CV to the line DV to power the driver circuit 52 from the power converter, and to connect the lines TD and RD to the lines TV and RV respectively for d.c. feed to the line 58. In this mode the control circuit 60 produces the signal L=1 for low power operation of the power converter 50.

Although the embodiment of the invention as described above is particularly convenient, especially in that it requires only the addition of the gates 44 and 46 and an extra stage of frequency division in the divider 40, together with the binary control signal L, the invention is not limited to this. Other switching frequencies, optionally with other than 2:1 frequency and/or duty cycle ratios, may be used, and with appropriate filtering the frequencies could be within the critical frequency range from 4 kHz to 270 kHz. Other arrangements can also be provided for producing the lower frequency pulse signal for controlling the power converter and determining its switching frequency. In addition, other control arrangements may be provided for selecting different switching frequencies for the power converter, and a selection from more than two such frequencies may be provided to facilitate operation at various different maximum power levels.

It is also noted that, although the above description largely relates high voltage signalling to high power levels and lower voltages to lower power levels, this need not be the case. For example, for message waiting signalling the power converter is required to provide high voltages and relatively low power, so that in this high voltage signalling state the power converter can be operated in its low frequency and low power mode as described above.

Thus although a particular embodiment of the invention has been described in detail, it should be appreciated that these and numerous other modifications, variations, and adaptations may be made without departing from the scope of the invention as defined in the claims.

What is claimed is:

1. A switchmode power converter including a switching transistor having a controlled path connected in series with a primary winding of a transformer, a control circuit for controlling the transistor to conduct during pulses of a variable pulse width signal thereby to control an output voltage of the power converter, the output voltage being derived from a secondary winding of the transformer, and a circuit for providing as the variable pulse width signal selectively either a first PWM (pulse width modulated) signal at a first fixed frequency or a second PWM signal at a second fixed frequency lower than the first fixed frequency, the second PWM signal having a smaller duty cycle than the first PWM signal.

2. A power converter as claimed in claim 1, including a logic circuit for producing the second PWM signal from the first PWM signal by periodically masking pulses of the first PWM signal.

3. A power converter as claimed in claim 2 wherein the logic circuit is arranged to mask alternate pulses of the first PWM signal to produce the second PWM signal.

4. A power converter as claimed in claim 1 wherein the first fixed frequency is a harmonic of the second fixed frequency.

5. A power converter as claimed in claim 4, for use in a telephone subscriber line interface circuit, wherein the second fixed frequency is greater than 270 kHz.

6. A power converter as claimed in claim 1, for use in a telephone subscriber line interface circuit, wherein the second fixed frequency is greater than 270 kHz.

7. A telephone subscriber line interface circuit including a power converter as claimed in claim 1 for selectively generating a ringing signal waveform for supply to a telephone subscriber line or a supply voltage for a driver circuit for supplying loop current on the line, and a control circuit for supplying the power converter with the first PWM signal for generating the ringing signal waveform and the second PWM signal for generating the supply voltage for the driver circuit.

8. A line interface circuit as claimed in claim 7 wherein the second fixed frequency is greater than 270 kHz.

9. A line interface circuit as claimed in claim 8 wherein the first fixed frequency is a harmonic of the second fixed frequency.

10. A line interface circuit as claimed in claim 9, including a logic circuit for producing the second PWM signal from the first PWM signal by periodically masking pulses of the first PWM signal.

11. A telephone subscriber line interface circuit comprising:

a driver circuit for supplying loop current on a telephone subscriber line;

a power converter for selectively generating either a high voltage ringing signal waveform for supply to the line or a supply voltage for the driver circuit, the power converter including a switching transistor having a controlled path for supplying current to a primary winding of a transformer and a PWM (pulse width modulated) circuit for controlling the switching transistor thereby to control a voltage generated by the power converter and derived from a secondary winding of the transformer; and a control circuit for selectively supplying from the PWM circuit to the switching transistor a first PWM signal having a first fixed frequency when the power converter is generating the high voltage ringing signal and a second PWM signal having a second fixed frequency, less than the first fixed frequency, when the power converter is generating the supply voltage for the driver circuit.

12. A line interface circuit as claimed in claim 11 wherein the second fixed frequency is greater than 270 kHz.

13. A line interface circuit as claimed in claim 11 wherein the first fixed frequency is a harmonic of the second fixed frequency.

14. A line interface circuit as claimed in claim 11, including a logic circuit for producing the second PWM signal from the first PWM signal by periodically masking pulses of the first PWM signal.

15. A method of reducing power dissipation in a power converter which is used in a telephone subscriber line interface circuit for selectively generating either a high voltage signalling waveform, at a relatively high power level for supply to a telephone subscriber line, or a supply voltage, at a relatively lower power level for a driver circuit for providing loop current on the telephone subscriber line, the power converter comprising a switching transistor responsive to a PWM (pulse width modulated) control signal for controlling a voltage generated by the power converter, comprising the steps of:

providing a first PWM signal at a first fixed frequency as the PWM control signal for generating the high voltage signalling waveform at a relatively high power level; and providing a second PWM signal at a second fixed frequency, lower than the first fixed frequency, as the PWM control signal for generating the supply voltage at a relatively lower power level.

16. A method as claimed in claim 15 wherein the second fixed frequency is greater than 270 kHz.

17. A method as claimed in claim 15 wherein the step of providing the second PWM signal comprises periodically masking pulses of the first PWM signal to produce the second PWM signal.

18. A method as claimed in claim 17 wherein the second fixed frequency is greater than 270 kHz.

19. A method as claimed in claim 17 wherein alternate pulses of the first PWM signal are masked to produce the second PWM signal.

20. A method as claimed in claim 19 wherein the second fixed frequency is greater than 270 kHz.

21. A method as claimed in claim 15 and further comprising the step of selectively generating a high voltage message waiting signal at a relatively low power level for supply to the telephone subscriber line by providing the second PWM signal as the PWM control signal.

* * * * *